May 27, 1969 R. H. SCHAFER 3,446,157
MEANS FOR ASPIRATING LIQUID AND SOLID MATERIALS
Filed July 27, 1967
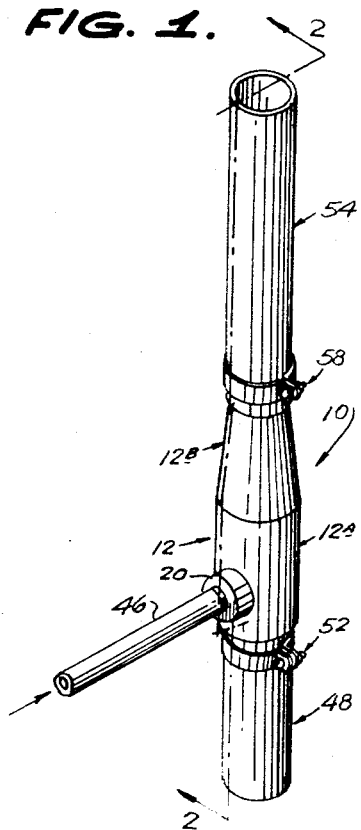
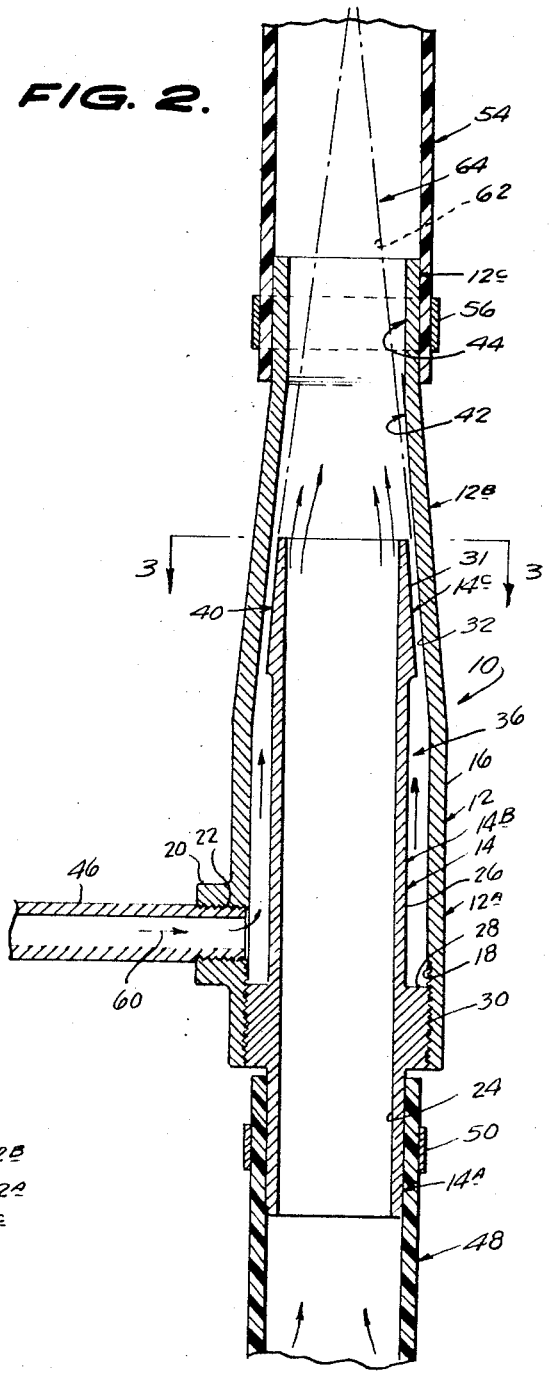
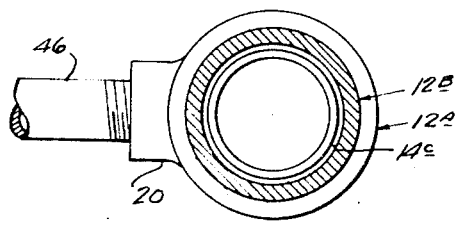
INVENTOR.
ROBERT H. SCHAFER,
BY Kimmel, Crowell & Weaver
ATTORNEYS.

United States Patent Office 3,446,157
Patented May 27, 1969

3,446,157
MEANS FOR ASPIRATING LIQUID AND SOLID MATERIALS
Robert H. Schafer, Capitola, Calif., assignor to Schafer-Davis Engineering Co., Inc., Corte Madera, Calif., a corporation of California
Filed July 27, 1967, Ser. No. 656,377
Int. Cl. B65g 53/42; F04f 5/10
U.S. Cl. 103—258                                     5 Claims

ABSTRACT OF THE DISCLOSURE

Apparatus including a pair of open ended conduits interfitted within one another in spaced relation relative to each other to form an annular high pressure axially extending chamber therebetween, means at one adjacent pair of ends of the conduits closing the adjacent end of the chamber and stabilizing the spaced relationship between the conduits, the open end of the inner conduit at the aforementioned one end thereof comprising a material inlet opening, means on the outer one of the conduits affording connection of the annular chamber with a high pressure fluid means and communicating with the chamber adjacent the closure means, and the adjacent other pair of ends of said conduits comprising the material discharge end of the apparatus and being complementarily configured so as to provide a shaped high vacuum space at this end of the apparatus.

*Background of invention*

Many efforts have been made, and the prior art is rampant with examples thereof, to provide versatile aspirating apparatus which is adaptable, and without conversion or modification, to the transfer of liquids and solids from one site to another. None of these aspirating devices, however, has found commercial success for such apparatus, if operable, is bulky in construction and too unwieldable for one man operation. Such apparatus also involves the use of many lines, controls, and was generally too heavy to manipulate with facility.

Such apparatus, as is evinced by the prior art, is highly complex involving multiple parts of which a large number are movable relative to one another. Such parts usually require machining to high tolerances and require constant maintenance and this, of course, involves high costs. Not infrequently prior art apparatus has to be shut down for repair and remains inoperable until a replacement part may be located. If the replacement part is not immediately available it must be ordered from a remote distributing point, or alternatively, the part must be fabricated locally as a special job, all involving high costs of operation.

Still other disadvantages are encountered in related apparatus in that the same are seldom compatible with existing pressure systems when making a changeover from one job to another or when converting from liquid to solid material transference, and the apparatus of the prior art is seldom found to be adaptable for the handling of more than one type of material without knock-down and modification requiring the insertion or removal of component elements or the rearrangement thereof.

Again, the construction of the prior art devices is such that the high vacuum necessary on the inlet side of the device when used for commercial purposes is seldom obtained and, consequently, the apparatus works at but a low efficiency.

It is, therefore, one of the primary objects of this invention to provide aspirating apparatus not subject to the disadvantages noted above and other numerous objectionable characteristics which are attendant during the use of analogous devices and which do not require recitation at this time.

Another object of this invention is to provide aspirating means which comprises of but two conduits interfittted one wihin the other to provide coaction therebeween in the nature of valve control means.

A further object of this invention is to provide aspirating apparatus which may be cast from light weight conventional materials and interfitted with one another, all with but a minimum of machining operations.

A still further object of this invention is to provide aspirating apparatus of the type to which reference has been made generally supra and wherein the interfitted conduits are complementarily configured so as to maintain a high vacuum (or a high negative pressure) on the discharge end thereof, the high vacuum resulting as a consequence of the shaping of the aspirating medium at the discharge end of the apparatus.

It is a further object of this invention to provide aspirating apparatus of the type generally described above wherein the conduits are mounted for axial moveemnt relative to one another, and are so configured as to coact with one another to form valve control means operable to cut off the supply of aspirating medium when moved in one direction and to selectively control the supply thereof, and consequently the operating pressure of the apparatus, when the conduits are moved relative to each other in the other of the aforementioned directions.

Other and further objects and advantages of the instant invention will become more evident from a consideration of the following specification when read in the light of the annexed drawings.

In the drawings:

FIGURE 1 is a perspective view of aspirating apparatus constructed in accordance with this invention;

FIGURE 2 is an enlarged detail medial transverse cross-sectional view, FIGURE 2 being taken substantially on the vertical plane of line 2—2 of FIGURE 1 looking in the direction of the arrows; and FIGURE 3 is a detail fragmentary cross-sectional view, FIGURE 3 being taken substantially on the horizontal plane of line 3—3 of FIGURE 2, looking in the direction of the arrows.

Referring now more specifically to the drawing, reference numeral 10 designates, in general, aspirating apparatus constructed in accordance with the teachings of this invention. The apparatus 10 illustrated therein comprises, essentially, two interfitted open-ended elongated substantially hollow conduits here identified in general by the reference numerals 12 and 14, respectively. The outermost one of the conduits, hereinafter referred to as the "housing" 12, and its interfitting conduit 14 are preferably cast of light weight aluminum material, and are cast within their respective working tolerances so accurately that, immediately after casting, the components are ready for assembly subject only to the few machining operations to be described in detail below.

For the purpose of clarity of description, the open-ended elongated and substantially hollow housing 12 may be considered as comprising three integrally connected sections identified as the inlet section 12A, the central section 12B, and the discharge section 12C. Of these sections, the section 12A is substantially cylindrical in transverse cross-section, the central section 12B has a hollow frusto-conical configuration, and the discharge section 12C has a substantially hollow cylindrical transverse cross-section throughout its length, the discharge section 12C having inner and outer diameters smaller than the corresponding diameters of the inlet section 12A.

The housing 12 includes a side wall 16 of uniform thickness throughout its length, the side wall 16 adjacent the outer end of the inlet section 12A being internally threaded as at 18 to serve a function to be described infra. Adjacent to but spaced inwardly from this end of the inlet section 12A, the side wall 14 is formed with a radially and outwardly projecting enlarged boss 20 having an opening extending therethrough and which is internally threaded as at 22. As is seen in FIGURE 2 of the drawing, the inner end of the opening through the boss 20 is in open communication with the interior of the inlet section 12A. The inner end of the inlet section 12A is integrally connected with the adjacent end of the central section 12B at substantially the base end thereof. The side wall 16 is here shown as converging inwardly from its junction with the adjacent end of the inlet section 12A towards the outlet section 12C.

Again referring to FIGURE 2 of the drawing, it is seen that the other end of the central section 12B is integral with the inner end of the discharge section 12C at the plane of the frustum of the central section 12B.

The side wall 16 of the discharge section 12C is of uniform cylindrical configuration and is disposed in coaxial relationship relative to the central section 12B, and in coaxial concentric relationship relative to the inlet section 12A.

In the described arrangement of the sections 12A, 12B and 12C, the inner surface of the central section 12B is disposed at an angle of five degrees with respect to the inner cylindrical surfaces of the sections 12A and 12C, respectively.

The inner conduit 14 is formed with an internal bore or passageway 24 which extends axially therethrough from end to end, and is of uniform diameter throughout its length. The side wall 26 of the inner conduit 14 comprises an inlet portion 14A, a central portion 14B, and a discharge portion 14C. As in the case of the housing 12, the adjacent ends of the portions 14A, 14B and 14C are integrally connected.

The inlet portion 14A, adjacent the inner end thereof, is provided with an enlarged circumferential flange 28 which is externally threaded as at 30 to mate with the internal threads 18 formed on the section 12A to provide connecting means between the housing 12 and the inner conduit 14 when these elements are assembled as shown in FIGURE 2, and to provide adjustable valve control means in a manner to be described below.

The flange 28 is disposed substantially at the integral connection between the inner end of the portion 14A and the adjacent end of the central portion 14B, and the outer end of the latter is integrally connected with the enlarged base end of the discharge portion 14C which, as seen in FIGURE 2 of the drawing, has a frusto-conical external configuration. The external frusto-conical surface of the discharge portion 14C is inclined at an angle of substantially two and a half degrees with respect to the internal surface 24 of the side wall 26 and, when the housing 12 and inner conduit 14 are threaded together and assembled as is shown in FIGURE 2 of the drawing, the frusto-conical surface of the portion 14C, here identified by reference numeral 31 is normally juxtaposed in spaced relationship relative to the internal frusto-conical surface 32 of the central section 12B.

With the housing 12 and the inner conduit 14 assembled as shown in FIGURE 2, there arises as a consequence of this assembly an elongated axially extending annular chamber 36 which is defined as that space which exists between the section 12A and the confronting portion of the portion 14B. As is seen in FIGURE 2, one end of the chamber 36 is closed by the flange 28 while the other end of the chamber 36 is on open communication with a substantially frusto-conical passage 40 which is defined as being disposed between the adjacent confronting areas of the central section 12B and the discharge portion 14C. The outer end of the frusto-conical passage 40 is in open communication, under normal circumstances, with the frusto-conical chamber 42 which is defined by that length of the side wall 16 of the section 12B which extends between the open inner end of the conduit 14 and the junction of the section 12B with its associated section 12C at the plane of the frustum of the former. The apparatus 10 further includes the substantially cylindrical chamber 44 formed in the section 12C, the inner end of the chamber 44 being in open communication with the apex end of the frusto-conical chamber 42, as described above, and in lieu of any other connecting apparatus, the opposed end of the cylindrical chamber 44 would open to the atmosphere.

The above comprises a specific description of the apparatus 10, per se, and there follows below a description of the function of the same and references to specific fields of use for the apparatus, it being understood that the same are offered as merely examples of the utility of the apparatus and are not to be construed as being limitations thereof. The examples are proffered merely to illustrate the versatility of the device or apparatus 10.

Thus, and in employing the apparatus 10, one end of an elongated conduit 46 is threadedly connected in the internally threaded boss 20, the other end of the conduit 46 being connected with a suitable preselected source of aspirating medium such as, for example, air under pressure or water as delivered by a water pump. Obviously, other aspirating mediums could be selected in accordance with the nature and function of the operation that the aspirating apparatus 10 is to perform.

The outer end of the cylindrical portion 14A has one end of an elongated substantially flexible conduit 48 telescoped thereover and releasably secured thereto by a conventional clamping band 50 and its associated releasable clamping means indicated at 52 in FIGURE 1. The band 50 and means 52 are conventional in the art. The other end of the flexible conduit 48 is adapted to be placed in or proximate to the material (not shown) which is to be transported.

One end of a second elongated substantially hollow cylindrical flexible conduit 54 is telescoped over the section 12C, and is releasably clamped thereon as by the cyclindrical clamping band 56 which substantially surrounds the same and is releasably clamped thereagainst by the releasable clamping means 58, all in the old and well known manner. The other end of the conduit 54 is disposed in or is proximate to the site of the discharge of the material to be transported.

With the apparatus connected and disposed in the manner described above, and assuming that the aspirating medium is compressed air, the air under pressure will flow through the conduit 46 in the direction of the arrow 60 and will fill and completely occupy the annular chamber 36. From the chamber 36 the air is forced through the restricting frusto-conical passage 40 for discharge into the frusto-conical chamber 42. Through the judicious selection of the angles of the frusto-conical surfaces of the enlargement 31 and the surface 32 of that portion of the side wall 16 which confronts the same through the section 12B, there is effected a high vacuum space 62 which is of a substantially conical configuration as is indicated by the dotted lines 64. As is seen in FIGURE 2 of the drawing, the high velocity air which passes the open outer end of the portion 14C is directed and shaped to extend the conical vacuum well beyond the outer open end of the discharge section 12C and into an appreciable portion of the adjacent end of the discharge conduit 54.

Through the shaping of the vacuum space 62 extremely high suction or vacuum pressures are made available at the outer end of the inlet conduit 48 to create a lifting force on the material to be transported which is comparable to the effect that may be obtained through the use of centrifugal pumps and analogous equipment of more complicated and expensive construction.

Through the appropriate selection of an inexpensive aspirating medium such as, air or water, the apparatus 10 may be used to transfer liquid or solid materials and is effective in the cleaning out of post holes, concrete forms, and the apparatus is also adaptable for sand blasting and the pumping of water out of areas where conventional pumps cannot be used due to the inaccessibility of the collected liquid.

With specific reference to the sand blasting operation, it is only necessary for the user to insert the remote end of the flexible conduit 48 into a sand box or receptacle, it being assumed, of course, that the conduit 46 is connected with the proper aspirating medium. As the sand is aspirated through the inner conduit 14 for discharge through the discharge conduit 54, the user has complete control over the apparatus since cutoff can be obtained through the mere turning of the inner conduit 14 relative to the housing 12 to cause the surfaces 31, 32 to engage one another and effectively act as valve cutoff means for the supply of the aspirating medium through the frusto-conical passage 40. There is no necessity for the operator to employ handle means for valve controls nor to permit the apparatus to whip around out of control as could easily be the circumstance if the control over the aspirating medium were inaccessible or located at a distance from the user as, for example, on the compressor or pump.

As for the case of pumping water from normally inaccessible locations, perhaps one of the most difficult problems encountered is the maintenance of substantially dry bilges. Bilge pumps are, of course, old and well known in the art, but such pumps on relatively large ships are generally provided with fixed inlet ports located in the bilge compartments. Now the inept loading of vessels can cause the same to incline at an angle to the port or starboard sides thereof to the extent that the inlet ports disposed in the bilges and connected with the pumping system become exposed and, instead of pumping water from the bilge, the same only draw air. The same condition is encountered, of course, under severe storm conditions when the degree of pitch of the vessel is extreme. Thus, with the fixed inlet ports, the bilge pumps rapidly lose their efficiency and frequently fail to serve their intended purpose.

Still further, the conduits of the inlet sides of the bilge pumps frequently become clogged with various types of debris thereby rendering the pumps inoperative, and such systems also require the installation and maintenance of complicated pumping machinery which constantly requires maintenance.

The aspirating means 10 as constructed in accordance with the teachings of the present invention overcomes the bilge pumping difficulties mentioned above not only in connection with large vessels but also in ships of relatively small displacement such as, for example, the conventional outboard and inboard motor boats including those of seagoing yacht size. In larger vessels, an air pressure system is usually available, and in the smaller ones thereof, as ancillary equipment it is only necessary to install a low power air compressor.

Other fields of use of the apparatus 10 may include, by way of example, the dry handling of grain such as wheat, rye and oats.

In a successfully tested and presently manufactured commercial article, highly satisfactory results were obtained by casting the housing 12 with an overall length of 12 inches, of which the axial length of the inlet section 12A was 5⅛ inches, the length of the central section 12B was 5⅛ inches, and the length of the discharge section 12C was 1¾ inches.

The outside diameter of the inlet section 12A was 3⅛ inches and its inside diameter was 2⅝ inches throughout its length. The length of the internal threads 30 formed on the section 12A was 1¼ inches, and the distance from the outer end of the inlet section 12A to the center of the internally threaded boss 20 was 2 inches. The diameter of the threaded boss 20 is ¾ inch with the outside diameter of the boss 20 being established at 1½ inches. The axial length of the boss 20 was preferably found to be ½ inch.

The angle of the frusto-conical surface 32 relative to the internal surfaces of the inlet section 12A and discharge section 12C is 5 degrees. The outside diameter of the discharge section 12C is 2 inches and the inside diameter thereof is 1⅝ inches. The length of the last named section is, of course, 1¾ inches.

The inner conduit 14 has, preferably, an overall axial length of 10⅜ inches of which the inlet portion 14A has an axial length of 2½ inches and the flange 28 extends axially for a distance of 1¼ inches. The axial length of the frusto-conical surface 31 is 2 inches at the discharge portion 14C, and the central portion 14B has, thus, an axial length of 4⅝ inches. The outside diameter of the portion 14C measured at the base end thereof is 2³⁄₁₆ inches and, as has been stated above, the taper of the portion 14C from its base end to its apex end is 2½ degrees.

For the most satisfactory results, the length of the discharge conduit 54 should be at least 12 inches and, of course, under sand blasting usage a conventional blasting nozzle or tip would be connected thereon.

If a small compressor or pump is connected with the conduit 46, and with the apparatus constructed in accordance with the immediately above description, the pump or compressor must be able to maintain a minimum pressure of 40 pounds in the annular chamber 36 for maximum results. If a small compressor or pump is employed, then it becomes necessary, of course, to thread the inner conduit 14 inwardly relative to the housing 12 to reduce the area of the passage 40 and, conversely, if a larger compressor or pump is employed, then the maximum efficiency can be obtained from the device or apparatus 10 by increasing, somewhat, the area of the frusto-conical passage 40. As has been mentioned above, the threading of the inner conduit 14 into the housing 12 to the extent that the frusto-conical surfaces 32, 31 make engagement with one another serves as valve control means in the nature of a cutoff valve for the aspirating medium.

From test data it has been found that with a compressor handling 125 c.f./m. (cubic feet of air per minute) the inlet section 14A pulled to 2.5 inches of mercury with an air compressor rated at 600 c.f./m., the apparatus 10 pulled 7.45 inches of mercury, and with a still larger 900 c.f./m., the apparatus specified above pulled between 9.75 and 9.85 inches of mercury. This is an efficiency which greatly exceeds comparable equipment and, in fact, compares favorably against centrifugal pumps of greater mass, complexity, and, of course, having a higher manufacturing cost. In the carrying out of the test data provided above, the axial length of the conduit 48 was 8 feet and the corresponding length of the discharge conduits 54 was 2 feet.

The increased efficiency of the aspirating device 10 may be attributed, primarily, to the back pressure which is created in the annular chamber 36. By virtue of this back pressure, the air passing through the frusto-conical passage 40 is distributed uniformly between the adjacent component elements of the apparatus and exits into the frusto-conical chamber 42 in such a manner as to provide the conically shaped vacuum space 62 as shown by dotted lines in FIGURE 2. The angularity of the confronting surfaces 31, 32 causes the air or water to define this conical area or space which has its projected apex end located well within the discharge conduit 54. Without this extension, whether the same be rigid or flexible as defined above, the efficiency of the apparatus is reduced approximately 50 percent. That is, the apparatus 10, to function efficiently, should have the extension discharge conduit 54 connected thereon and of such axial length as to accommodate the entire axial length of the cone-shaped vacuum space 62.

Having described and illustrated one embodiment of this invention in detail, it will be understood that the same is offered merely by way of example, and that this inven-

What is claimed is:
1. Material aspirating apparatus comprising
an elongated hollow housing having a pair of opposed open ends and including a fluid inlet section, a central section, and a fluid discharge section, said sections being disposed in end-to-end relationship relative to one another with their respective adjacent ends being integrally connected;

a first hollow conduit disposed within said housing and including a material inlet portion, a central portion, and a material discharge portion, said portions being disposed in end-to-end relationship relative to one another with their respective ends being integrally connected;

first means supporting said first conduit in concentric spaced relation relative to said housing with one end of said first conduit being spaced inwardly from the adjacent end of said housing, the other end of said first conduit extending axially beyond the other end of said housing, and with said central portion of said first conduit being disposed in confronting relationship relative to said fluid inlet section of said housing to define a chamber therebetween;

means on said fluid inlet section of said housing for connecting said chamber with a source of fluid under high pressure;

said first means also supporting said first conduit with said discharge portion thereof being normally disposed in confronting juxtaposition relative to said central section of said housing, and said discharge portion of said first conduit having an external enlargement thereon to form, in cooperation with said central section, a passage in open communication with the other end of said chamber and restricting the flow of said fluid through said passage;

said central section of said housing and said enlargement on said first conduit are each provided with internal and external coaxial frusto-conical surfaces, respectively, with the degree of taper on each surface, respectively, being of a different degree and said surfaces cooperating to provide said passage therebetween with a hollow frusto-conical configuration;

said first means including means on said other end of said housing and cooperating means spaced inwardly from the other end of said first conduit to close and seal the adjacent one end of said chamber;

said including means being manually operable to effect axial movement of said first conduit relative to said housing to cause said enlargement to move towards and away from said confronting juxtaposed central section of said housing and thereby to provide valve control means for said fluid under high pressure; and said extended portion of said first conduit providing means for connecting said first conduit with the material to be aspirated.

2. Material aspirating apparatus as defined in claim 1 wherein
the apex end of said enlargement is disposed intermediate the ends of said central section to form a chamber in which the fluid medium discharged from said passage is shaped to form a centrally located high vacuum space;
said discharge section being internally cylindrical and receiving said shaped fluid medium axially therethrough.

3. Material aspirating apparatus as defined in claim 2 and
an elongated second conduit having a pair of opposed ends with one of its said ends being connected on said inlet portion, the other end thereof being disposed in or proximate to the material to be aspirated; and
a third conduit having a pair of opposed ends, said third conduit having an end thereof connected on said discharge section and its other end proximate the material discharge station; and
said third conduit receiving therein the terminal end of the shaped aspirating medium.

4. Material aspirating apparatus as defined in claim 3 wherein said shaped aspirating medium encloses a substantially conical high vacuum space.

5. Material aspirating apparatus as defined in claim 4 wherein said means on said housing for connecting said chamber to said source of a fluid medium under pressure comprises hollow conduit means.

References Cited

UNITED STATES PATENTS

| | | | |
|---|---|---|---|
| 970,232 | 9/1910 | Jakway | 230—112 |
| 1,227,180 | 5/1917 | Murta | 103—259 |
| 1,489,869 | 4/1924 | Waldron | 103—278 |
| 1,723,993 | 8/1929 | Black | 103—260 |
| 1,791,513 | 2/1931 | Slocum | 103—260 |
| 2,019,968 | 11/1935 | Holloway | 103—278 X |
| 2,399,249 | 4/1946 | Perignat | 103—272 |
| 2,786,651 | 3/1957 | Mickle | 103—260 X |
| 2,909,127 | 10/1959 | Bradaska | 103—260 |
| 3,175,515 | 3/1965 | Cheely | 103—262 |
| 3,282,227 | 11/1966 | Nielsen | 103—271 |

DONLEY J. STOCKING, *Primary Examiner.*

WARREN J. KRAUSS, *Assistant Examiner.*

U.S. Cl. X.R.

103—272; 230—92, 95